(12) United States Patent
Wann et al.

(10) Patent No.: US 11,470,368 B2
(45) Date of Patent: Oct. 11, 2022

(54) ASCRIPTION BASED MODELING OF VIDEO DELIVERY SYSTEM DATA IN A DATABASE

(71) Applicant: HULU, LLC, Santa Monica, CA (US)

(72) Inventors: James Wann, Seattle, WA (US); Milan Mehta, Sammanmish, WA (US); Cara Postilion, Seattle, WA (US); Adam Thomas Ahringer, Bellevue, WA (US); Gary Ames, Kenmore, WA (US)

(73) Assignee: HULU, LLC, Santa Monica, CA (US)

( * ) Notice: Subject to any disclaimer, the term of this patent is extended or adjusted under 35 U.S.C. 154(b) by 193 days.

(21) Appl. No.: 17/062,470

(22) Filed: Oct. 2, 2020

(65) Prior Publication Data
US 2022/0109899 A1    Apr. 7, 2022

(51) Int. Cl.
| | |
|---|---|
| *H04N 21/24* | (2011.01) |
| *H04N 21/25* | (2011.01) |
| *G06F 16/2457* | (2019.01) |
| *G06F 16/735* | (2019.01) |
| *G06F 16/78* | (2019.01) |
| *G06F 16/71* | (2019.01) |

(52) U.S. Cl.
CPC ... *H04N 21/2408* (2013.01); *G06F 16/24578* (2019.01); *G06F 16/71* (2019.01); *G06F 16/735* (2019.01); *G06F 16/7867* (2019.01); *H04N 21/251* (2013.01)

(58) Field of Classification Search
CPC .............. G06F 16/71; G06F 16/7867; G06F 16/24578; G06F 16/735; H04N 21/2408; H04N 21/251
See application file for complete search history.

(56) References Cited

U.S. PATENT DOCUMENTS

| | | | | |
|---|---|---|---|---|
| 11,283,890 B2* | 3/2022 | Benedetto | ............. | H04L 67/535 |
| 2009/0313232 A1* | 12/2009 | Tinsley | ............. | H04N 21/8543 707/999.005 |
| 2011/0110515 A1* | 5/2011 | Tidwell | ............. | H04N 21/4667 380/200 |
| 2017/0178692 A1* | 6/2017 | Wouhaybi | ........... | H04N 21/4532 |
| 2017/0346913 A1* | 11/2017 | Lopatecki | ............. | H04L 67/535 |

OTHER PUBLICATIONS

Drew Koszewnik,"NetflixGraph Metadata Library: An Optimization Case Study", https://medium.com/netflix-techblog/netflixgraph-metadata-library-an-optimization-case-study-6cc7d5eb2946, Jan. 28, 2013, 8 pages.

(Continued)

*Primary Examiner* — Nicholas T Corbo
(74) *Attorney, Agent, or Firm* — Kwan & Olynick LLP

(57) ABSTRACT

In some embodiments, a method reviews information from a set of clients. The information is based on interaction with an application associated with a video delivery system. The method selects ascription events from the information based on a model that defines ascription events that could lead to an outcome for the video delivery system and stores the ascription events into a set of data structures. The ascription events are stored based on respective timing information associated with the respective ascription event and one or more of the ascription events that could lead to the outcome are retrievable based on respective time information for the ascription events.

20 Claims, 10 Drawing Sheets

(56) References Cited

OTHER PUBLICATIONS

Netflix/Netflix-Graph,https://github.com/Netflix/netflix-graph,Oct. 2, 2020, 3 pages.
Reda Affance, Marketing Attribution,Part 1: Step up Your Marketing Attribution with Game Theory,https://medium.com/data-from-the-trenches/marketing-attribution-e7fa7ae9e919, Feb. 27, 2018, 13 pages.
Sami Sakly, https://www.researchgate.net/figure/Example-Markov-attribution-graph_fig3_309416430, Oct. 2, 2020, 2 pages.
Sami Sakly,"Toward a Dynamic Attribution Model for Marketing", https://www.researchgate.net/publication/309416430_Toward_a_dynamic_attribution_model_for_marketing, Sep. 2016, 25 pages.

\* cited by examiner

700 ▸

| 702-1 | 702-2 | 702-3 | 702-4 | 702-5 | 702-6 |
|---|---|---|---|---|---|
| User Session ID | ID2 | Event Type | Interaction Timestamp | Entity ID | Content ID |
| User #1 | CPD session ID | Collection item impression 708-1 | TS1 | Entity #1 | |
| User #1 | CPD session ID | Collection item impression 708-2 | TS2 | Entity #2 | |
| User #1 | CPD session ID | Collection item impression 708-3 | TS3 | Entity #3 | |
| User #1 | CPD session ID | Collection item impression 708-4 | TS4 | Entity #1 | |
| User #1 | CPD session ID | Collection impression 708-5 | TS5 | Entity #3 | |
| User #1 | CPD session ID | Action impression | TS6 | Entity #1 | |
| User #1 | CPD session ID | Page impression | TS7 | Entity #4 | |
| User #1 | CPD session ID | Cover story impression 706 | TS8 | Entity #5 | |
| User #1 | CPD session ID | User Interaction | TS9 | Entity #6 | Content #1 704 |

FIG. 7

ASCRIPTION BASED MODELING OF VIDEO DELIVERY SYSTEM DATA IN A DATABASE

BACKGROUND

To measure the effectiveness of content, such as movies, television shows, etc., that are presented to user accounts (e.g., subscribers of a video delivery system), a service reconstructs a series of events that represents the path taken by the user account to perform some action. To perform the reconstruction, the service may store information for the path in an event graph, which may include many nodes that depend on each other to show the progression of events. The construction of the event graph is computationally resource intensive. For example, the database that is used to store the graph may include many links, pointers, or other methods (e.g., collectively "links") to represent the relationship of nodes in the event graph. The links may connect entries and/or tables together in the database. The cost to implement the links to store the data for the event graph is high. Also, querying the data using the links is also computationally expensive because retrieving the data requires following the links to retrieve other entries.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings:

FIG. 7 depicts an example of an ascription rank table according to some embodiments.

DETAILED DESCRIPTION

Figure 1:
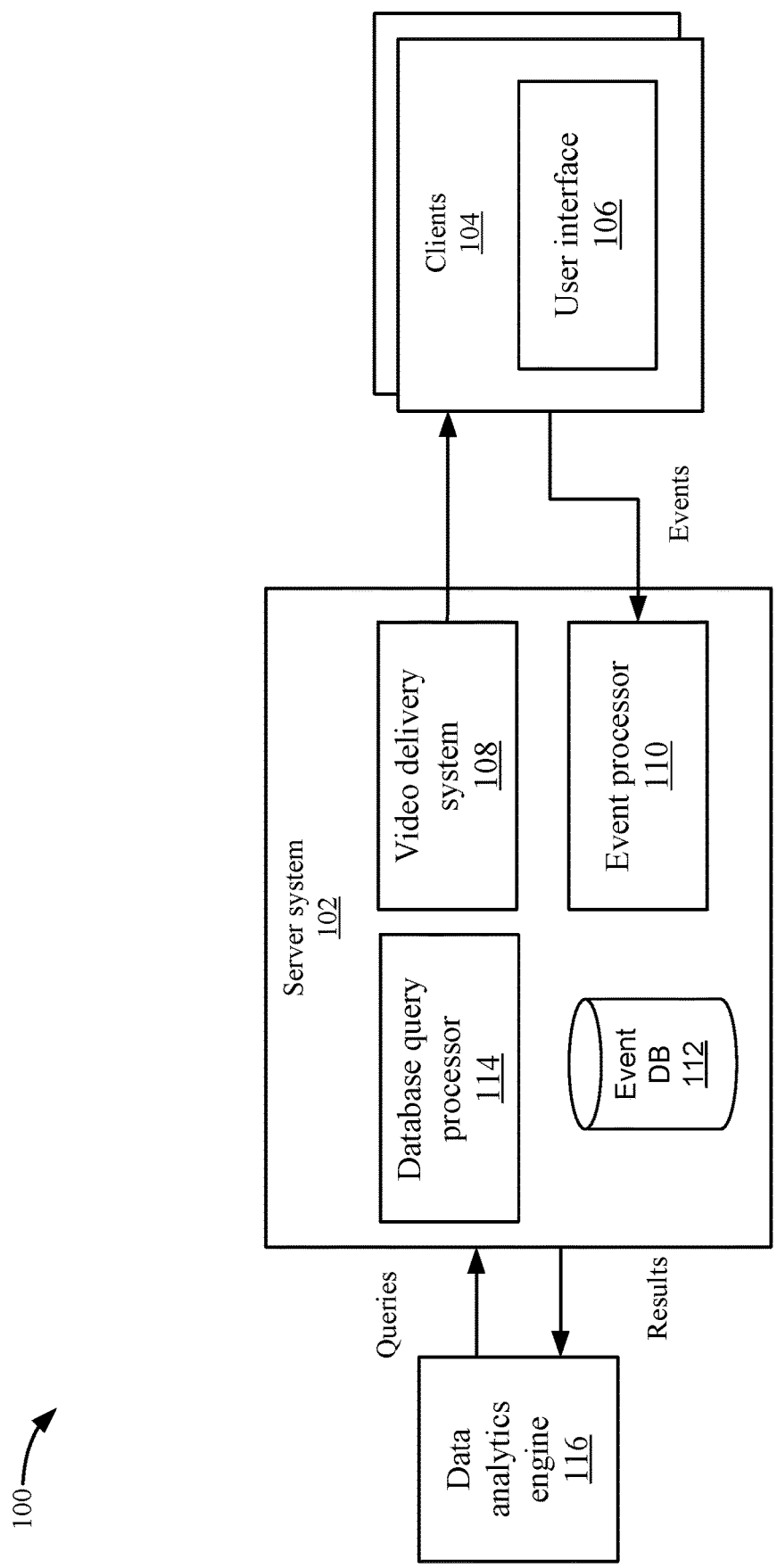
FIG. 1 depicts a simplified system for analyzing events according to some embodiments.

Described herein are techniques for a database system. In the following description, for purposes of explanation, numerous examples and specific details are set forth in order to provide a thorough understanding of some embodiments. Some embodiments as defined by the claims may include some or all of the features in these examples alone or in combination with other features described below and may further include modifications and equivalents of the features and concepts described herein.

A system models an ascription to determine ascription events that may lead to a specified outcome, which may be a desirable outcome or an undesirable outcome. For example, the specified outcome may be playback of content (e.g., desirable outcome) or canceling of a service (e.g., undesirable outcome). The ascription may be a synthetic (or artificial) fact that is used to mark events that may be attributable to the specified outcome. For example, the ascription events may be events that may lead to a start of playback of content on a video delivery system. Although playback is described, it will be understood that other specified outcomes may be used, such as adding a video to a collection for a user account. The other specified outcomes may use another ascription that is used to model ascription events that may lead to the new specified outcome. The fact is synthetic in that the events may lead to playback, but not all events may be the cause of playback. The fact is synthetic in the respect that it explicitly states the inference that a particular event is a candidate for causing a particular desired outcome. In addition, the reason this is considered synthetic is that the inference does not exist until it becomes stated and stored in the system. Since not all events may be the cause of a desired outcome (such as a playback event), synthesizing this fact explicitly serves to create an easy to query data structure that may allow for further automated analysis.

A large amount of telemetry information may be received from a user interface of the client. However, only some of the telemetry information may be related to ascription events. The system identifies ascription events from the telemetry information and stores the ascription events in a database. The ascription events may include actions taken on a user interface of a client, such as browse actions, search actions, etc. that lead to receiving a selection for playback of content. Rather than storing data for a graph of a path of events, the system uses a time linear aspect of the events as the basis for storing the ascription events that lead to the video playback. The graph of the sequence of events represent non-linear times in an event space. However, by organizing the events time linearly, the amount of computing resources that are used is lowered because the database does not need to store links between entries. Rather, the events may be stored with timestamps, which do not require links between entries.

When referring to video delivery (e.g., streaming video) on the video delivery system, the video delivery system may receive engagement from a user account on an application displayed in a user interface in multiple ways, either serially or concurrently. Activities, such as search, browsing, and playback, may take place serially or simultaneously in a single linear dimension of time. The system receives telemetry information from clients and can determine ascription events from the telemetry information. Then, the system can store these ascription events in data structures based on a timestamp associated with the event (e.g., the time in which the event was received at the user interface). Then, a data analytics engine can query the data structures to reconstruct events in a time linear series that led to the specified outcome. For example, the data analytics engine may generate an ascription rank table, which summarizes a set of ascription events that precede the playback of the content based on a timestamp in which the ascription events occurred.

System Overview

FIG. 1 depicts a simplified system 100 for analyzing events according to some embodiments. System 100 includes a server system 102 and clients 104. Server system 102 may include computing devices that implement a database system and a video delivery system 108. It is recognized that server system 102 may include multiple computing devices that execute different functions that are described. That is, the database system and the video delivery system may be separate systems. Also, the functions may be performed on different computing devices, or the same computing device.

Video delivery system 108 may deliver content to clients 104. Content may include videos, such as movies, television shows, advertisements, etc. Also, video delivery system 108 may provide an application that is displayed on a user interface 106 at clients 104. The application receives interactions from user accounts (e.g., users), such as browsing, searching, and viewing of the videos on user interface 106.

Clients 104 may include different client devices that can display user interface 106 and play back content. For example, clients 104 include living room devices, smartphones, tablet devices, televisions, set top boxes, etc. Multiple clients 104 may be used by different user accounts, which may be associated with users that view the videos. When user accounts use the application displayed on user interface 106, clients 104 send telemetry information for actions that occur. The telemetry information may be readings or status information regarding the use of clients 104. For example, the telemetry information may be the direct result of a user account action or may indirectly result in an action. An indirect action may be a heartbeat from a client 104 during playback of a video. A direct action may be an input of a search query or a selection of playback of content by a client 104.

In some embodiments, clients 104 send a large amount of telemetry information for various reasons. An event processor 110 may receive the telemetry information and process the telemetry information to determine events that occurred at clients 104. In some embodiments, event processor 110 may use an ascription model to determine which events to store in an event database 112. For example, the ascription model may model types of events that may be attributable to a specified outcome. For example, the ascription model may define information that is used to identify different types of ascription events that may lead to the specified outcome of video playback. An ascription event may be an event that is defined by the model as potentially leading to the specified outcome. Event processor 110 analyzes the telemetry information to determine the events that are the ascription events.

In some embodiments, each different type of ascription event may be stored in event database 112, such as in a respective table. However, the ascription events may be stored in different configurations, such as in one table or in different numbers of tables. The ascription events in each respective table may be associated with multiple user accounts and/or clients 104.

Event processor 110 may store the ascription events based on a time for each event. For example, the time may be a timestamp, which may be a time that is assigned to the ascription event (e.g., when the event occurred on the application). Because event processor 110 stores the ascription entries using a time, event processor 110 may not link ascription entries together in event database 112. Rather, the linear time aspect of the events is used to determine ascription events that may lead to the specified outcome. Accordingly, a query can retrieve entries from the tables based on parameters that define a time that is associated with each respective event.

A data analytics engine 116 can submit the queries to a database query processor 114. Database query processor 114 may then query the data stored in event database 112. In some embodiments, database query processor 114 may retrieve entries based on parameters in the queries, which may include a time parameter. Database query processor 114 may then rank the retrieved entries from the tables based on a parameter from the query, such as in a linear time order (e.g., ascending or descending time). Data analytics engine 116 then receives the results, which may include the entries that are ranked. For example, the results may rank the entries by time, but may use other parameters to rank the entries. Each entry may be associated with a timestamp and can be analyzed to determine the events that led to the specified outcome. In some embodiments, database query processor 114 may not need to follow links based on a graph or other method to determine which entries to retrieve. Further, to create those links, the data is analyzed to define the links between the data. Storing the ascription events based on time does not require analyzing links. Rather, data can be queried in a time ordered process to determine ascription events that may have led to the specified outcome. The process will now be described in more detail.

Event Processing

Figure 2:
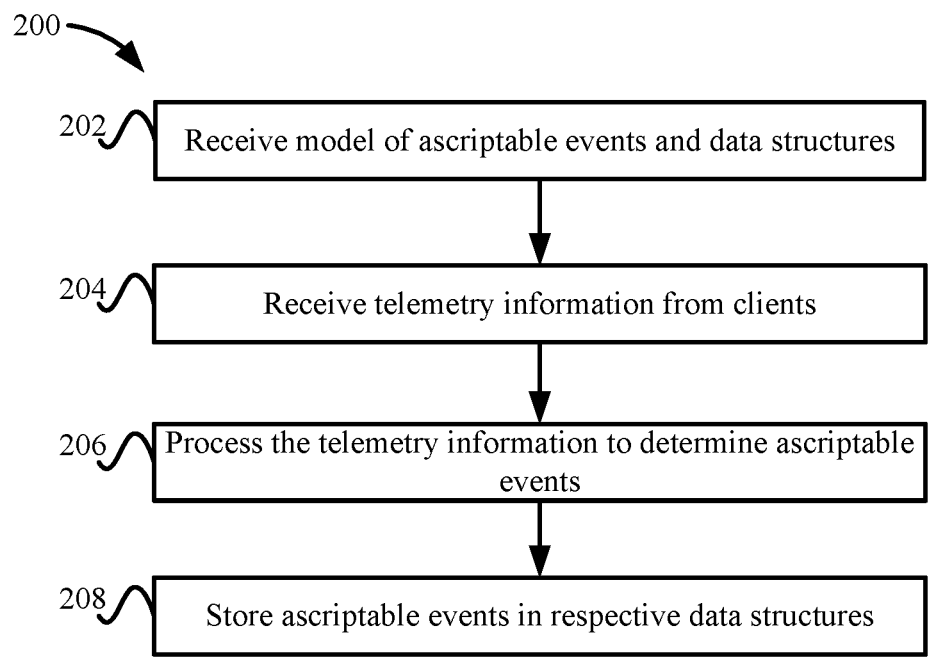
FIG. 2 depicts a simplified flowchart for processing events from clients according to some embodiments.

FIG. 2 depicts a simplified flowchart 200 for processing events from clients 104 according to some embodiments. At 202, event processor 110 receives a model that describes ascription events and data structures for the associated ascription events. The model may define information for different event types that allows event processor 110 to select the ascription events from the telemetry information received from clients 104. For example, the model may define metadata for the ascription events. The model may select ascription events as those events that are attributable to achieving a specified outcome. For example, the model determines ascription events that may lead to a video playback event and defines metadata for those events. In some embodiments, models that determine ascription events to a specified outcome may be automatically determined. For example, after identifying the specified outcome, server system 102 uses specified outcome to review events across historical user account behavior. Through evaluating the large sample of user account behavior, server system 102 may identify statistically significant recurring events or categories of events that are candidates of ascription events. Server system 102 may verify that these candidates can then be verified for efficacy through the use of an AB testing mechanism to forward-test whether the ascription events may constitute a valid cause of desired (or undesirable) outcomes.

At 204, event processor 110 receives telemetry information from clients 104. As discussed above, the telemetry information may be from different clients 104 and different user accounts.

At 206, event processor 110 processes the telemetry information to determine the ascription events. For example, event processor 110 compares the metadata for the ascription events from the model to information in the telemetry information to determine ascription events that occurred at clients 104.

Figure 3:
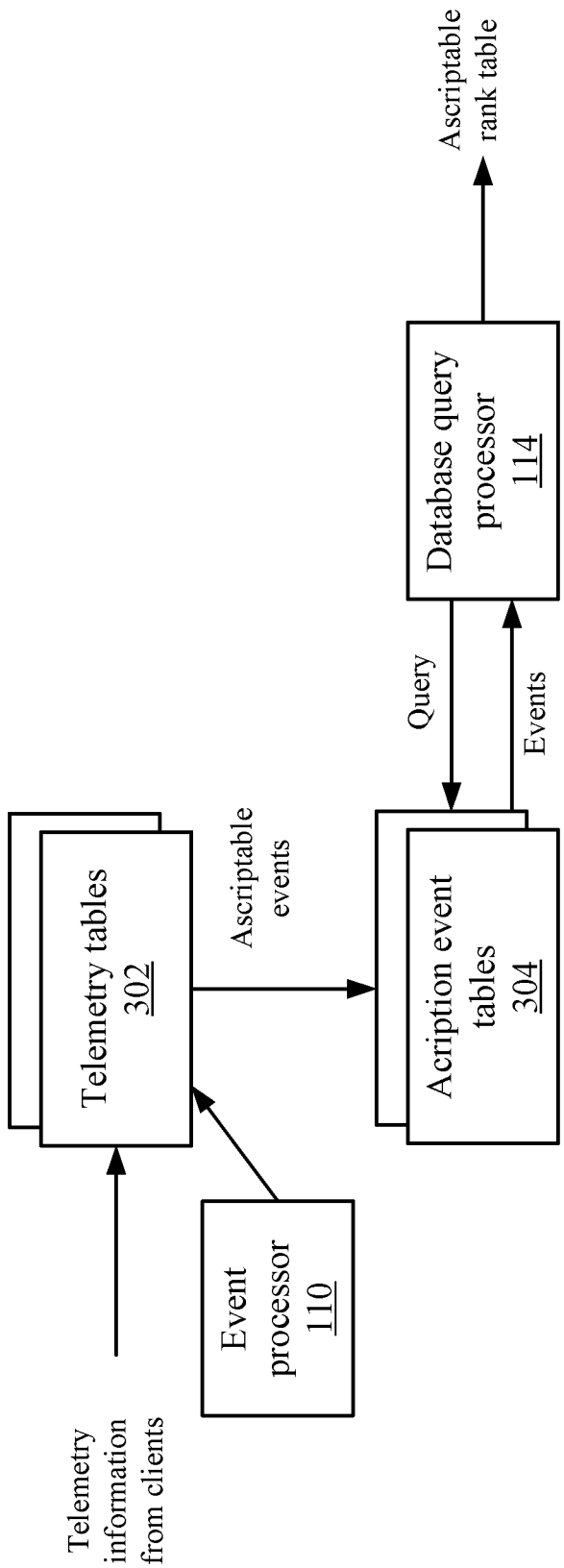
FIG. 3 depicts a more detailed example of the event processing according to some embodiments.

At 208, event processor 110 stores the ascription events in respective data structures in event database 112. For example, each type of ascription event may be stored in an associated data structure, which may be one or more tables. FIG. 3 depicts a more detailed example of the event processing according to some embodiments. Telemetry information is received from clients 104 and stored in telemetry tables 302. Telemetry information in telemetry tables 302 may be considered raw or source data. That is, the telemetry information may not have been processed to determine ascription events. Also, telemetry tables 302 may store all the telemetry information that is received from clients 104, or at least some telemetry information that is not considered to be for ascription events. In some embodiments, the telemetry information in telemetry tables 302 is organized differently from ascription event tables 304. For example, the telemetry information in telemetry tables 302 may be organized based on a data model that stores telemetry information by user session, browse activity, device, content playback session summary, content playback session attribution, ads activity, and pause ads activity. Event processor 110 may associate the ascription event entries with the associated telemetry type, such as by browse activity or content playback session.

Event processor 110 processes the telemetry information in telemetry tables 302 to generate events that are ascription events. The ascription model may include a rule or rules that processes telemetry information and retrieves information for the ascription events. For example, filters are used to filter out telemetry information that is not associated with ascription events. Then, event processor 110 stores the ascription events in ascription event tables 304. In some embodiments, ascription event tables 304 may include tables that are defined for specific events. Some examples of ascription events include cover story impression, collection impression, collection item impression, search impression, search click, search query, page impression, action impression, user interaction, deep link launch, and voice command. A cover story may be an area or location on user interface 106 that promotes a piece of content in the cover story that a user can select. For example, user interface 106 may display the cover story upon the start of a session for a user account. A collection may be a grouping of one or more pieces of content (e.g., videos). A collection impression may be when a collection is selected. A collection item may be one item that is in the collection, and a collection impression is a selection of a collection item in a collection. A search impression may be when a search is performed. A search click may be when a search result is selected. A search query is information entered for a search query. A page impression may be when a page is displayed in the user interface 106. A deep link launch is when a link may be selected that specifies a location in client 104, such as a mobile application running on client 104. A voice command may be when a voice command is received. In some embodiments, the ascription model determines that these events may be attributable to the specified outcome. However, the ascription model may be adjusted to determine other events that are deemed to be ascription events. Further, other specified outcomes may have different associated ascription events. The ascription models may be configured based on specified outcomes by specifying metadata for the ascription events. Redesign of the database system to store ascription events in ascription event tables 304 may not be needed as the ascription events are stored based on time, and not links between entries. Accordingly, links do not need to be defined. Rather, tables to store ascription events in a time linear format are needed.

Event processor 110 stores the ascription events based on timing information associated with the events, such as a timestamp associated with when the event occurred. For example, ascription event tables 304 store the events in chronological order. For example, a column or other information is associated with entries in each table that is based on the timestamp.

Database query processor 114 may query events in ascription event tables 304 to retrieve events. Then, database query processor 114 may generate an ascription rank table from the events. The ascription rank table may rank the events based on some parameter, such as a time order, from a query from data analytics engine 116.

Event Timelines

As discussed above, an ascription defines a fact that is used to mark ascription events of interest that may lead to a specified outcome. The ascription model selects the ascription events from different events that could occur when receiving interactions from a user with an application on user interface 106. For example, video playback is a specified outcome for video delivery system 108. The ascription events are selected from a list of browse activities that may lead to a user selecting a piece of content to play. The actions taken before the specified outcome may be important to understand. Analyzing and predicting which events lead to the specified outcome may be helpful to video delivery system 108 to provide a better experience in the application and cause more users to select videos to playback.

Figure 4:
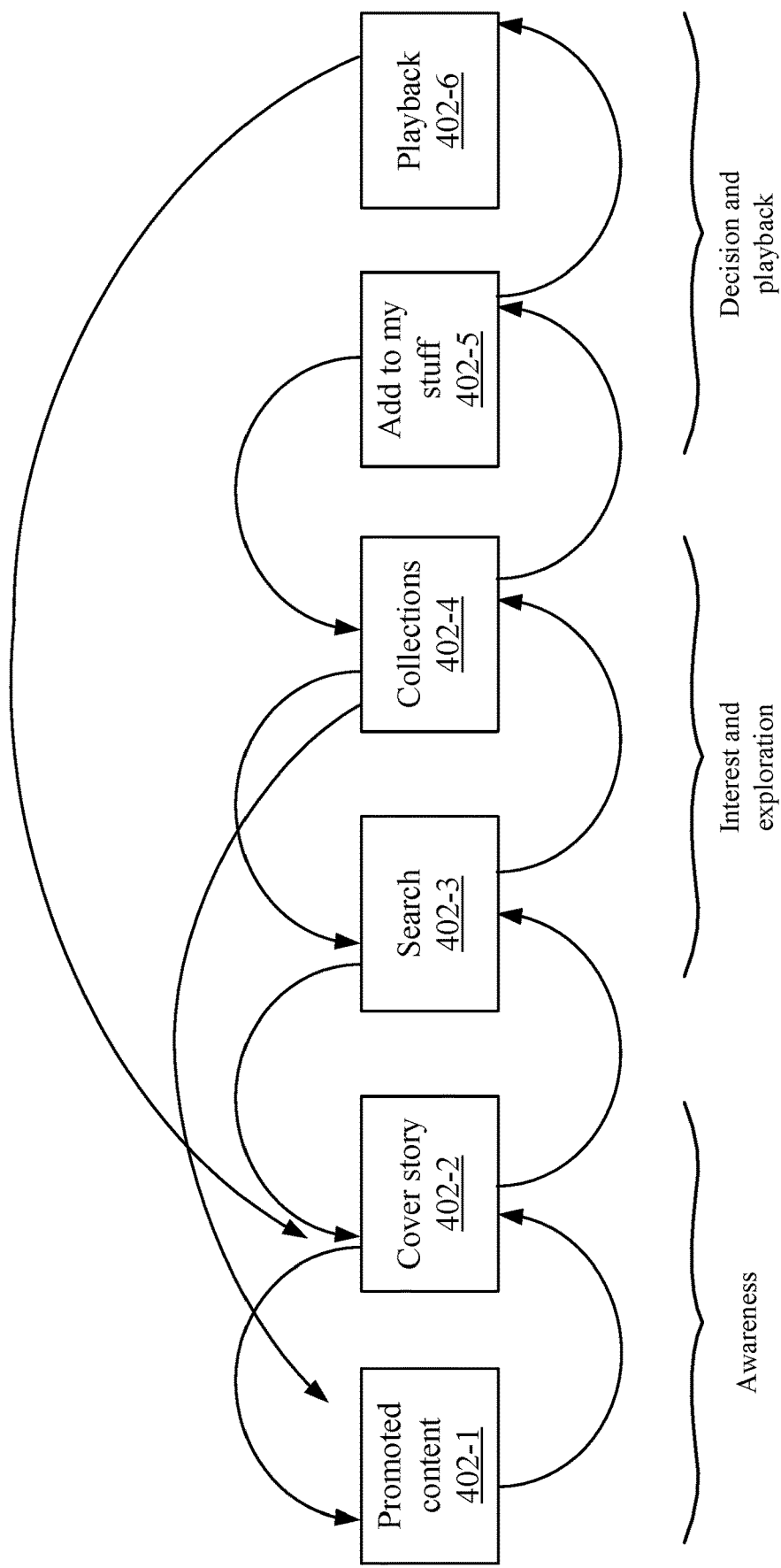
FIG. 4 depicts an example of an event experience according to some embodiments.

FIG. 4 depicts an example of an event experience according to some embodiments. Events 402-1 to 402-6 may summarize some events that occur to reach a specified outcome of playback of content at 402-6. For example, a user account may become aware of content, may show interest and exploration of content, and then make a decision on playback of content.

The awareness of content may occur based on promoted content or a cover story. The promoted content may promote certain content and a cover story may highlight content that may be of interest to the user account. During interest and exploration, searching events and browsing of collections may occur. Then, during decision and playback, content may be added to a collection of my stuff, which is a list of content that is selected as a favorite of a user account, and playback may occur. Events may occur in a different order, which is illustrated by the arrows between entities in FIG. 4. It is noted that the arrows are just illustrative of a user experience during a session. Other experiences may be appreciated.

Figure 5A:
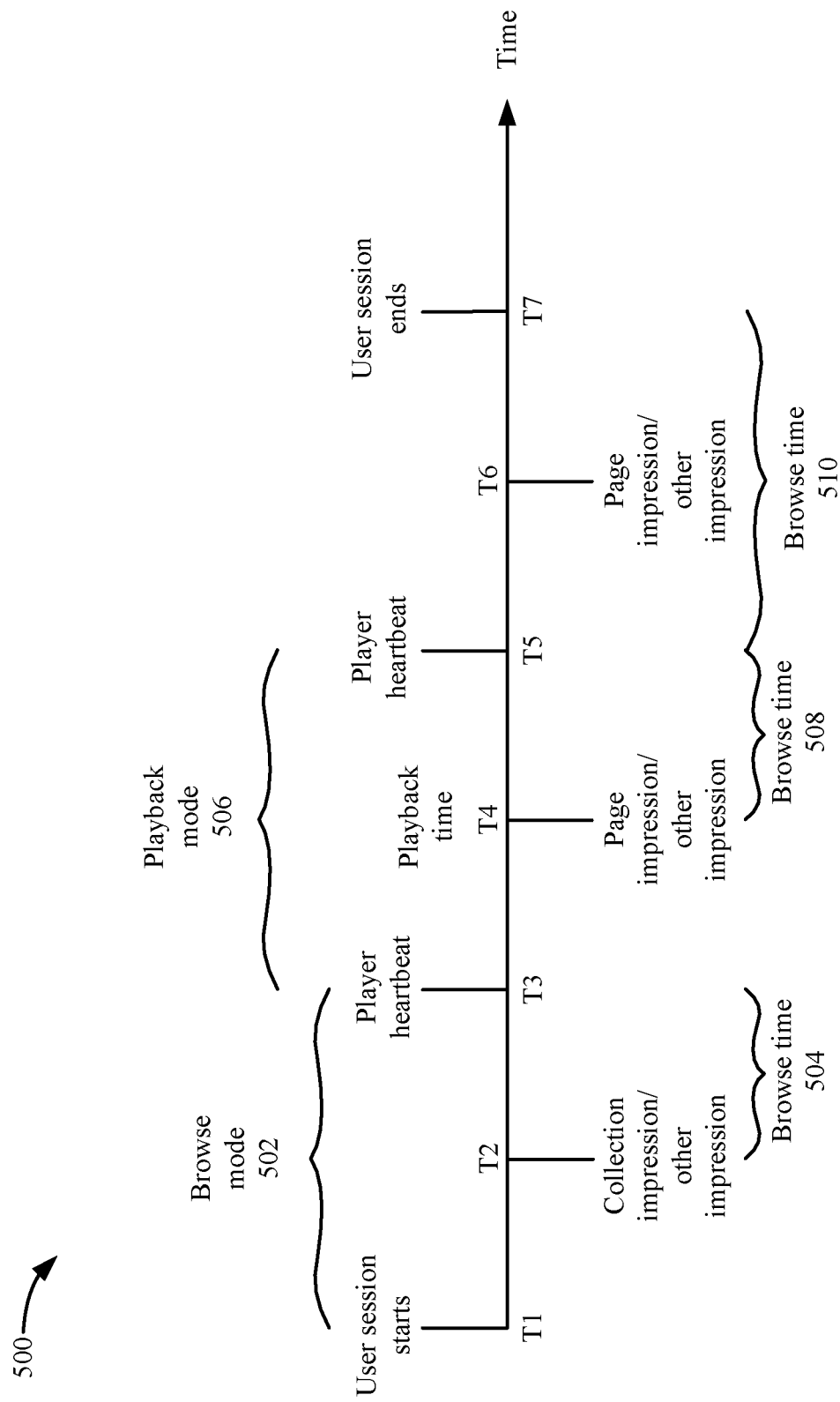
FIG. 5A depicts an example of a timeline that may occur based on user account interactions with an application according to some embodiments.

Keeping track of the interdependencies between the order in which events occur require complicated graphs. However, as discussed above, the ascription events are stored using time entries. FIG. 5A depicts an example of a timeline that may occur based on user account interactions with an application according to some embodiments. Within a session, content playback activities and browse activities may occur that may or may not lead to the specified outcome. Although browse and playback activities are discussed, other types of activities may be appreciated, such as advertising activities.

Timeline 500 may include multiple sequential times T1 to T7. The times may be represented by identifiers that represent sequential time values and various time granularities may be appreciated. Each time may be associated with an event. For example, at a time T1, a user session starts. At time T2, a collection impression or other impression occurs. A collection impression may be when some event on a collection occurs. For example, a collection may be displayed on the application. At time T3, a player heartbeat occurs. An occurrence of a player heartbeat may be when a media player sends a heartbeat message, which may mean the media player is playing content at that time. At time T4, a page impression or other impression occurs. A page impression may be when some event on a page being displayed occurs. For example, a page may be displayed on the application. During the playback time, a user may be performing other actions in the pages that are displayed. In some embodiments, the playback may be in a picture-in-a-picture and a user account is performing other actions, such as browsing a page. At time T5, another player heartbeat occurs. Then, at time T6, another page impression/other impression occurs, and finally at time T7, the user session ends, such as when the user logs out of the application or a time out occurs after a certain length of time elapses.

The ascription model may classify different events into different categories, such as a browse mode and a playback mode. Browse mode may be when a user is browsing and not playing back a video. For example, at 502, a user may be browsing, and at 510, a user may be browsing. Also, browse time may be the difference between a timestamp of an impression and when playback starts or a user session ends. Total browse time may be the total time of browse times across the session. Playback time may be the time difference between player heartbeats while in playback mode. For example, at 504, browse time is between time T2 and T3 (ends when playback begins. Also, at 508, while playback is occurring, additional browse time occurs between time T4 and T5. At 510, browse time is between time T5 and T7 (ends when the user session ends). A session end may be triggered by non-activity, such as by 30 minutes of non-activity, or when a user ends the session affirmatively by logging out.

Figures 5B, 5C, 5D:
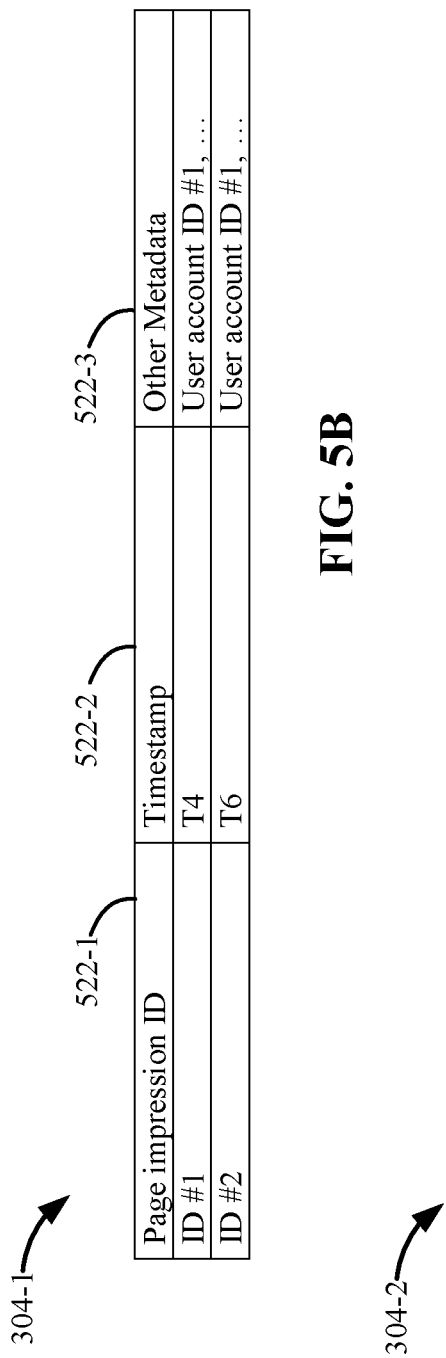
FIGS. 5B to 5D depict examples of ascription event tables according to some embodiments.

The above timeline may send telemetry information from client 104 to event processor 110 based on actions performed in the application. Event processor 110 analyzes the telemetry information and stores the ascription events in ascription event tables 304 in event database 112. FIGS. 5B to 5D depict examples of ascription event tables 304 according to some embodiments. The depicted event tables illustrate information for ascription events that may be stored, but variations may be appreciated. Also, ascription event tables 304 may store other entries for the same session, and also entries for other sessions from other clients and user accounts.

In FIG. 5B, ascription event table 304-1 stores ascription events for page impressions. Column 522-1 may store a page impression ID, column 522-2 stores a timestamp, and column 522-3 stores other metadata. The page impression ID may identify the page on which an impression is received, the timestamp may be the time in which the page impression is received, and other metadata may be information about the page impression, such as a user account ID, etc. Table 304-1 stores information for page impressions that occur at times T4 and T6.

In FIG. 5C, ascription event table 304-2 stores ascription events for collection impressions. Column 522-1 may store a collection impression ID, column 522-2 stores a timestamp, and column 522-3 stores other metadata. The collection impression ID may identify the collection (e.g., a group of related videos) on which an impression is received, the timestamp may be the time in which the collection impression is received, and other metadata may be information about the collection impression, such as a user account ID, etc. Table 304-2 stores information for the collection impression that occurs at time T2.

In FIG. 5D, ascription event table 304-3 stores ascription events for action impressions. Column 522-1 may store an action impression ID, column 522-2 stores a timestamp, and column 522-3 stores other metadata. The action impression ID may identify the action (e.g., content) on which an impression is received, the timestamp may be the time in which the page impression is received, and other metadata may be information about the action impression, such as a content ID for the content that is played, a user account ID, etc. Table 304-1 stores information for action impressions that occur at times T3 and T5.

Ascription event tables 304 store the entries based on the timestamp. The entries may not be linked together to show the path taken in the session. This simplifies the storing of entries in ascription event tables 304 because links are not added to the tables.

Upon being stored in event database 112, data analytics engine 116 may query the ascription event tables 304 to determine ascription rank tables.

Ascription Rank Tables

Figure 6:
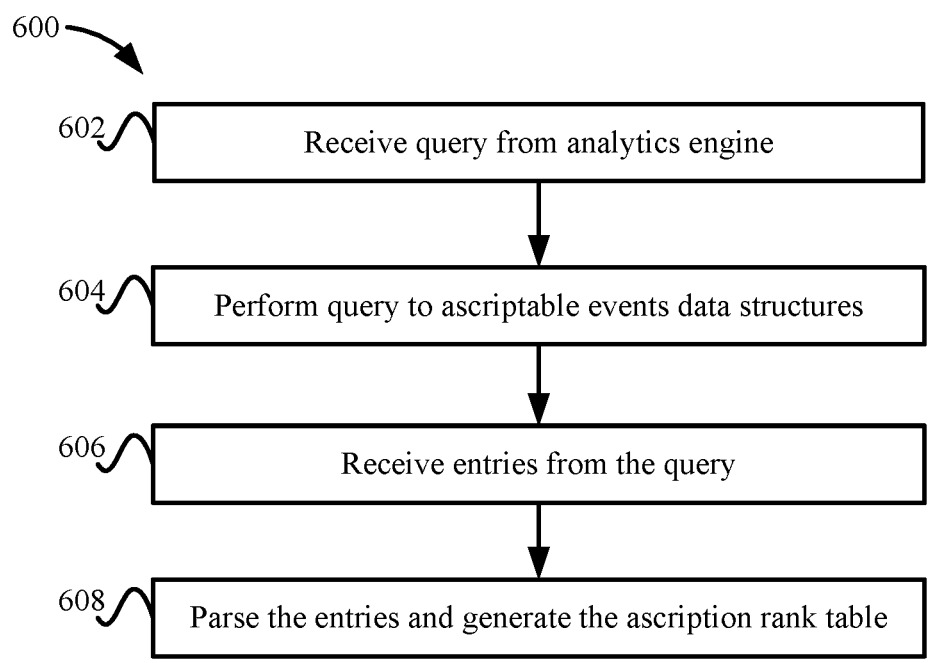
FIG. 6 depicts a simplified flowchart of a method for generating ascription rank tables according to some embodiments.

At times, data analytics engine 116 may generate ascription rank tables, which can be used to determine which events may lead to the specified outcome. FIG. 6 depicts a simplified flowchart 600 of a method for generating ascription rank tables according to some embodiments. At 602, database query processor 114 receives a query from data analytics engine 116. The query may include different parameters that define which ascription events should be retrieved from data structures in event database 112.

At 604, database query processor 114 performs a query to the data structures in ascription event tables 304 of event database 112 using the parameters. In some embodiments, the query may specify a time parameter that defines a time range in which to retrieve entries along with other parameters, such as a content ID and other metadata. At 606, database query processor 114 receives entries from the query. At 608, database query processor 114 parses the data to generate an ascription rank table. In some embodiments, database query processor 114 may organize or rank the entries based on a parameter. For example, the entries may be ranked by timestamp in descending or ascending order, or by other parameters, such as by event type. Then, database query processor 114 may output the ascription rank table.

FIG. 7 depicts an example of an ascription rank table 700 according to some embodiments. The query may select content playback (CPB) activities during a time period that lead to an ascription event of playback for a video. The query may list parameters for a user session ID and a CPB session ID during a time period and then request the events that are before the ascription event of video playback, such as ten minutes before the specified outcome occurs. The ascription events may be related to content playback events, but other categories of events may also be retrieved if other types are specified, such as browse activities.

Table 700 includes columns 702-1 to 702-6 for a User Session Identifier (ID), an ID #2, an Event Type, an Interaction Timestamp, an Entity ID, and a Content ID. Column 702-1 depicts entries that are associated with a user session ID, which may be a user account. The query may also specify a second ID that may include further information for the event, such as a category of event (e.g., a content playback activity). Column 702-2 lists the CPB session ID as the second ID, which is a content playback activities. Column 702-3 lists the event type, column 702-4 lists the interaction timestamp, column 702-5 lists the entity ID, and column 702-6 lists the content ID. The content ID may be associated with the content in which the specified outcome is associated. The timestamp may be a time associated with the ascription event. The entity ID may be the entity in which the ascription event is associated. In this example, the events that may lead to the specified outcome can be displayed in table 700 for analysis. For example, at 704, the specified outcome may occur, which may be the playback of content #1. The events that are found in the user session for the user prior to starting playback may then be displayed, which may help determine what occurred to cause the playback. The entries may be organized by time, in this case, in ascending time order from a timestamp TS1 to a timestamp TS9.

In some embodiments, it can be determined that a cover story impression at 706 may have led to the playback event. That is, the last ascription event before playback was a selection of the cover story entity. However, before that ascription event occurred, other ascription events that occurred in the session may have led to the playback event. For example, collections and collection items were browsed and selected at 708-1 to 708-5.

Processing the query requires limited computing resources because the events are stored in ascription event tables 304 of event database 112 based on the timestamps and are easy to query. No other links between events may need to be traversed in ascription event tables 304 to retrieve entries. Database query processor 114 may determine the ascription event for the user ID. This means database query processor 114 may not retrieve an entry and then follow a link associated with that entry to retrieve another entry. Then, database query processor 114 may retrieve the events associated with an entity ID from a time before the ascription event. Performing this type of query instead of determining entries that are linked together may be less resource intensive. For example, database query processor 114 does not need to determine entries linked to ascription events. Rather, database query processor 114 uses the time range to retrieve entries based on the timestamp of the specified outcome. For example, may retrieve the entries from a time period before playback of content occurred. Accordingly, database query processor 114 can generate the ascription rank table based on a specific time based relationship between the ascription events and the specified outcome of the specified outcome. For example, the ascription rank table may arrange the ascription events in a chronological order to visualize the events that may have led to the specified outcome of playback.

Although the above ascription rank table is described, other ascription rank tables may be appreciated. For example, another ascription model may track the events that occur from the cover story to playback. In this example, the ascription events that occur from display to cover story to playback may be provided in an ascription rank table.

Conclusion

Accordingly, events may be classified as ascription events in a model and stored in associated data structures. Then, database query processor 114 may query tables and retrieve the entries based on parameters that may include a time. An inscription rank table can then display the entries based on the time and it can be determined which events may have led to a specified outcome. Storing the events based on a time in the data structures simplifies the format of the database. Also, querying the data structures uses fewer computing resources because links do not need to be followed to determine entries that match the query.

Example Embodiments

In some embodiments, a method comprising: reviewing, by a computing device, information from a set of clients, wherein the information is based on interaction with an application associated with a video delivery system; selecting, by the computing device, ascription events from the information based on a model that defines ascription events that could lead to an outcome for the video delivery system; and storing, by the computing device, the ascription events into a set of data structures, wherein the ascription events are stored based on respective timing information associated with the respective ascription event, and wherein one or more of the ascription events that could lead to the outcome are retrievable based on respective time information for the ascription events.

In some embodiments, the method further comprising: receiving a query that defines a parameter for the outcome; and retrieving entries for the one or more of the ascription events based on the parameter.

In some embodiments, the parameter comprises time information that is used to select the entries for the one or more of the ascription events.

In some embodiments, the parameter defines metadata associated with the one or more of the ascription events.

In some embodiments, the parameter defines the outcome.

In some embodiments, the method further comprising: ranking the entries based on a ranking parameter.

In some embodiments, the entries are ranked based on respective timing information associated with each of the one or more ascription events.

In some embodiments, the information from the set of clients comprises telemetry information regarding a status of the set of clients.

In some embodiments, the information from the set of clients comprises information associated with the ascription events and information that is not associated with the ascription events, and the information not associated with the ascription events is not stored in the set of data structures.

In some embodiments, the ascription events are associated with a set of categories of activities that are performed on the application.

In some embodiments, entries in the set of data structures are not linked with each other.

In some embodiments, the information from the set of clients is from a plurality of clients.

In some embodiments, the model comprises one or more rules to determine the ascription events from the information from the set of clients.

In some embodiments, the one or more rules are automatically determined based on the outcome.

In some embodiments, a non-transitory computer-readable storage medium containing instructions, that when executed, control a computer system to be operable for: reviewing information from a set of clients, wherein the information is based on interaction with an application associated with a video delivery system; selecting ascription events from the information based on a model that defines ascription events that could lead to an outcome for the video delivery system; and storing the ascription events into a set of data structures, wherein the ascription events are stored based on respective timing information associated with the respective ascription event, and wherein one or more of the ascription events that could lead to the outcome are retrievable based on respective time information for the ascription events.

In some embodiments, further operable for: receiving a query that defines a parameter for the outcome; and retrieving entries for the one or more of the ascription events based on the parameter.

In some embodiments, the information from the set of clients comprises information associated with the ascription events and information that is not associated with the ascription events, and the information not associated with the ascription events is not stored in the set of data structures.

In some embodiments, entries in the set of data structures are not linked with each other.

In some embodiments, the model comprises one or more rules to determine the ascription events from the information from the set of clients.

In some embodiments, an apparatus comprising: one or more computer processors; and a non-transitory computer-readable storage medium comprising instructions, that when executed, control the one or more computer processors to be operable for: reviewing information from a set of clients, wherein the information is based on interaction with an application associated with a video delivery system; selecting ascription events from the information based on a model that defines ascription events that could lead to an outcome for the video delivery system; and storing the ascription events into a set of data structures, wherein the ascription events are stored based on respective timing information associated with the respective ascription event, and wherein one or more of the ascription events that could lead to the outcome are retrievable based on respective time information for the ascription events.

System

Figure 8:
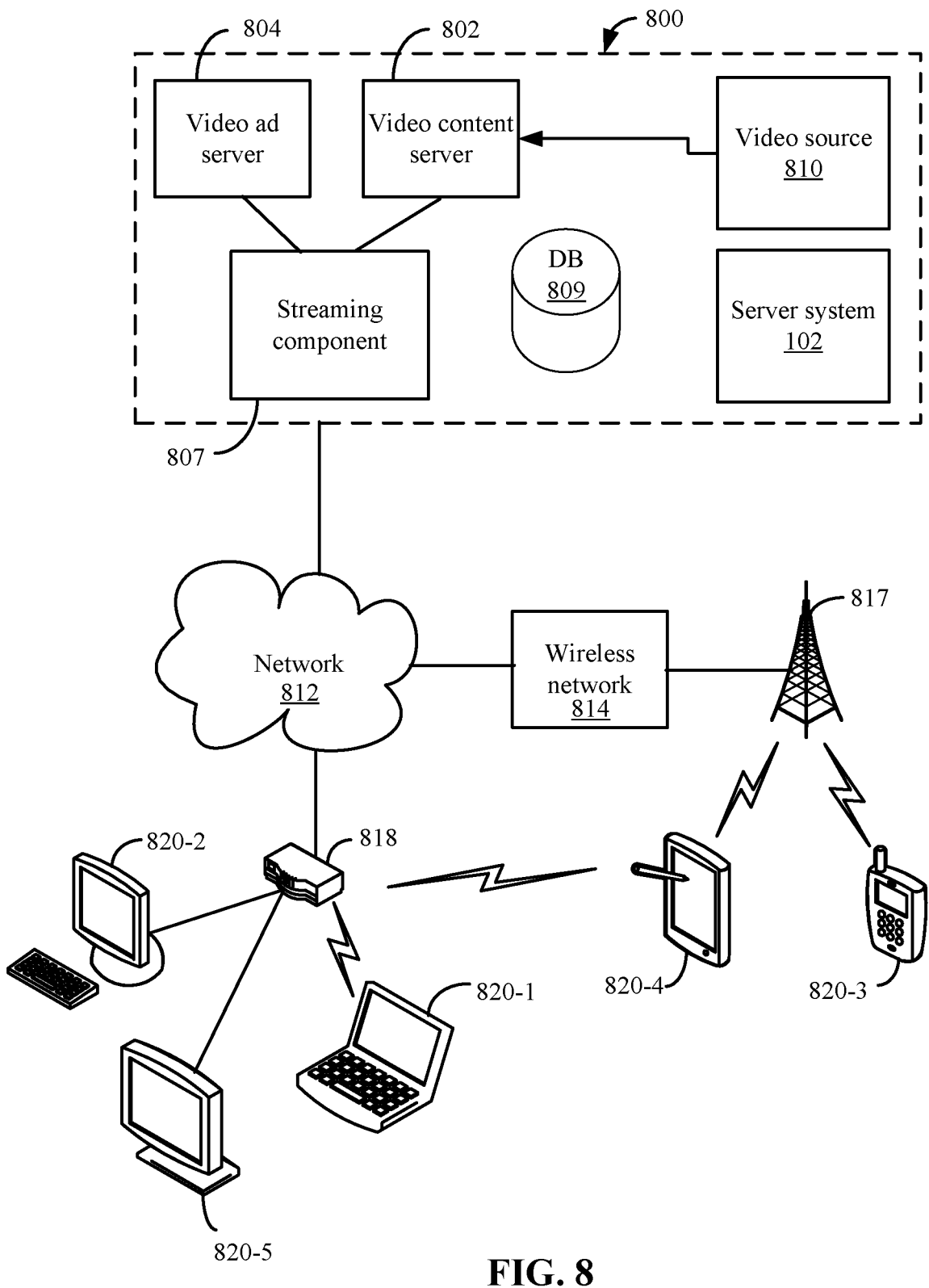
FIG. 8 depicts a video streaming system in communication with multiple client devices via one or more communication networks according to one embodiment.

Features and aspects as disclosed herein may be implemented in conjunction with a video streaming system 800 in communication with multiple client devices via one or more communication networks as shown in FIG. 8. Aspects of the video streaming system 800 are described merely to provide an example of an application for enabling distribution and delivery of content prepared according to the present disclosure. It should be appreciated that the present technology is not limited to streaming video applications and may be adapted for other applications and delivery mechanisms.

In one embodiment, a media program provider may include a library of media programs. For example, the media programs may be aggregated and provided through a site (e.g., website), application, or browser. A user can access the media program provider's site or application and request media programs. The user may be limited to requesting only media programs offered by the media program provider.

In system 800, video data may be obtained from one or more sources for example, from a video source 810, for use as input to a video content server 802. The input video data may comprise raw or edited frame-based video data in any suitable digital format, for example, Moving Pictures Experts Group (MPEG)-1, MPEG-2, MPEG-4, VC-1, H.264/Advanced Video Coding (AVC), High Efficiency Video Coding (HEVC), or other format. In an alternative, a video may be provided in a non-digital format and converted to digital format using a scanner and/or transcoder. The input video data may comprise video clips or programs of various types, for example, television episodes, motion pictures, and other content produced as primary content of interest to consumers. The video data may also include audio or only audio may be used.

The video streaming system 800 may include one or more computer servers or modules 802, 804, and/or 807 distributed over one or more computers. Each server 802, 804, 807 may include, or may be operatively coupled to, one or more data stores 809, for example databases, indexes, files, or other data structures. A video content server 802 may access a data store (not shown) of various video segments. The video content server 802 may serve the video segments as directed by a user interface controller communicating with a client device. As used herein, a video segment refers to a definite portion of frame-based video data, such as may be used in a streaming video session to view a television episode, motion picture, recorded live performance, or other video content.

In some embodiments, a video advertising server 804 may access a data store of relatively short videos (e.g., 10 second, 30 second, or 60 second video advertisements) configured as advertising for a particular advertiser or message. The advertising may be provided for an advertiser in exchange for payment of some kind or may comprise a promotional message for the system 800, a public service message, or some other information. The video advertising server 804 may serve the video advertising segments as directed by a user interface controller (not shown).

The video streaming system 800 also may include server system 102.

The video streaming system 800 may further include an integration and streaming component 807 that integrates video content and video advertising into a streaming video segment. For example, streaming component 807 may be a content server or streaming media server. A controller (not shown) may determine the selection or configuration of advertising in the streaming video based on any suitable algorithm or process. The video streaming system 800 may include other modules or units not depicted in FIG. 8, for example, administrative servers, commerce servers, network infrastructure, advertising selection engines, and so forth.

The video streaming system 800 may connect to a data communication network 812. A data communication network 812 may comprise a local area network (LAN), a wide area network (WAN), for example, the Internet, a telephone network, a wireless cellular telecommunications network (WCS) 814, or some combination of these or similar networks.

One or more client devices 820 may be in communication with the video streaming system 800, via the data communication network 812, wireless cellular telecommunications network 814, and/or another network. Such client devices may include, for example, one or more laptop computers 820-1, desktop computers 820-2, "smart" mobile phones 820-3, tablet devices 820-4, network-enabled televisions 820-5, or combinations thereof, via a router 818 for a LAN, via a base station 817 for a wireless cellular telecommunications network 814, or via some other connection. In operation, such client devices 820 may send and receive data or instructions to the system 800, in response to user input received from user input devices or other input. In response, the system 800 may serve video segments and metadata from the data store 809 responsive to selection of media programs to the client devices 820. Client devices 820 may output the video content from the streaming video segment in a media player using a display screen, projector, or other video output device, and receive user input for interacting with the video content.

Distribution of audio-video data may be implemented from streaming component 807 to remote client devices over computer networks, telecommunications networks, and combinations of such networks, using various methods, for example streaming. In streaming, a content server streams audio-video data continuously to a media player component operating at least partly on the client device, which may play the audio-video data concurrently with receiving the streaming data from the server. Although streaming is discussed, other methods of delivery may be used. The media player component may initiate play of the video data immediately after receiving an initial portion of the data from the content provider. Traditional streaming techniques use a single provider delivering a stream of data to a set of end users. High bandwidth and processing power may be required to deliver a single stream to a large audience, and the required bandwidth of the provider may increase as the number of end users increases.

Streaming media can be delivered on-demand or live. Streaming enables immediate playback at any point within the file. End-users may skip through the media file to start playback or change playback to any point in the media file. Hence, the end-user does not need to wait for the file to progressively download. Typically, streaming media is delivered from a few dedicated servers having high bandwidth capabilities via a specialized device that accepts requests for video files, and with information about the format, bandwidth and structure of those files, delivers just the amount of data necessary to play the video, at the rate needed to play it. Streaming media servers may also account for the transmission bandwidth and capabilities of the media player on the destination client. Streaming component 807 may communicate with client device 820 using control messages and data messages to adjust to changing network conditions as the video is played. These control messages can include commands for enabling control functions such as fast forward, fast reverse, pausing, or seeking to a particular part of the file at the client.

Since streaming component 807 transmits video data only as needed and at the rate that is needed, precise control over the number of streams served can be maintained. The viewer will not be able to view high data rate videos over a lower data rate transmission medium. However, streaming media servers (1) provide users random access to the video file, (2) allow monitoring of who is viewing what video programs and how long they are watched (3) use transmission bandwidth more efficiently, since only the amount of data required to support the viewing experience is transmitted, and (4) the video file is not stored in the viewer's computer, but discarded by the media player, thus allowing more control over the content.

Streaming component 807 may use TCP-based protocols, such as HTTP and Real Time Messaging Protocol (RTMP). Streaming component 807 can also deliver live webcasts and can multicast, which allows more than one client to tune into a single stream, thus saving bandwidth. Streaming media players may not rely on buffering the whole video to provide random access to any point in the media program. Instead, this is accomplished through the use of control messages transmitted from the media player to the streaming media server. Other protocols used for streaming are Hypertext Transfer Protocol (HTTP) live streaming (HLS) or Dynamic Adaptive Streaming over HTTP (DASH). The HLS and DASH protocols deliver video over HTTP via a playlist of small segments that are made available in a variety of bitrates typically from one or more content delivery networks (CDNs). This allows a media player to switch both bitrates and content sources on a segment-by-segment basis. The switching helps compensate for network bandwidth variances and also infrastructure failures that may occur during playback of the video.

The delivery of video content by streaming may be accomplished under a variety of models. In one model, the user pays for the viewing of video programs, for example, paying a fee for access to the library of media programs or a portion of restricted media programs, or using a pay-per-view service. In another model widely adopted by broadcast television shortly after its inception, sponsors pay for the presentation of the media program in exchange for the right to present advertisements during or adjacent to the presentation of the program. In some models, advertisements are inserted at predetermined times in a video program, which times may be referred to as "ad slots" or "ad breaks." With streaming video, the media player may be configured so that the client device cannot play the video without also playing predetermined advertisements during the designated ad slots.

Figure 9:
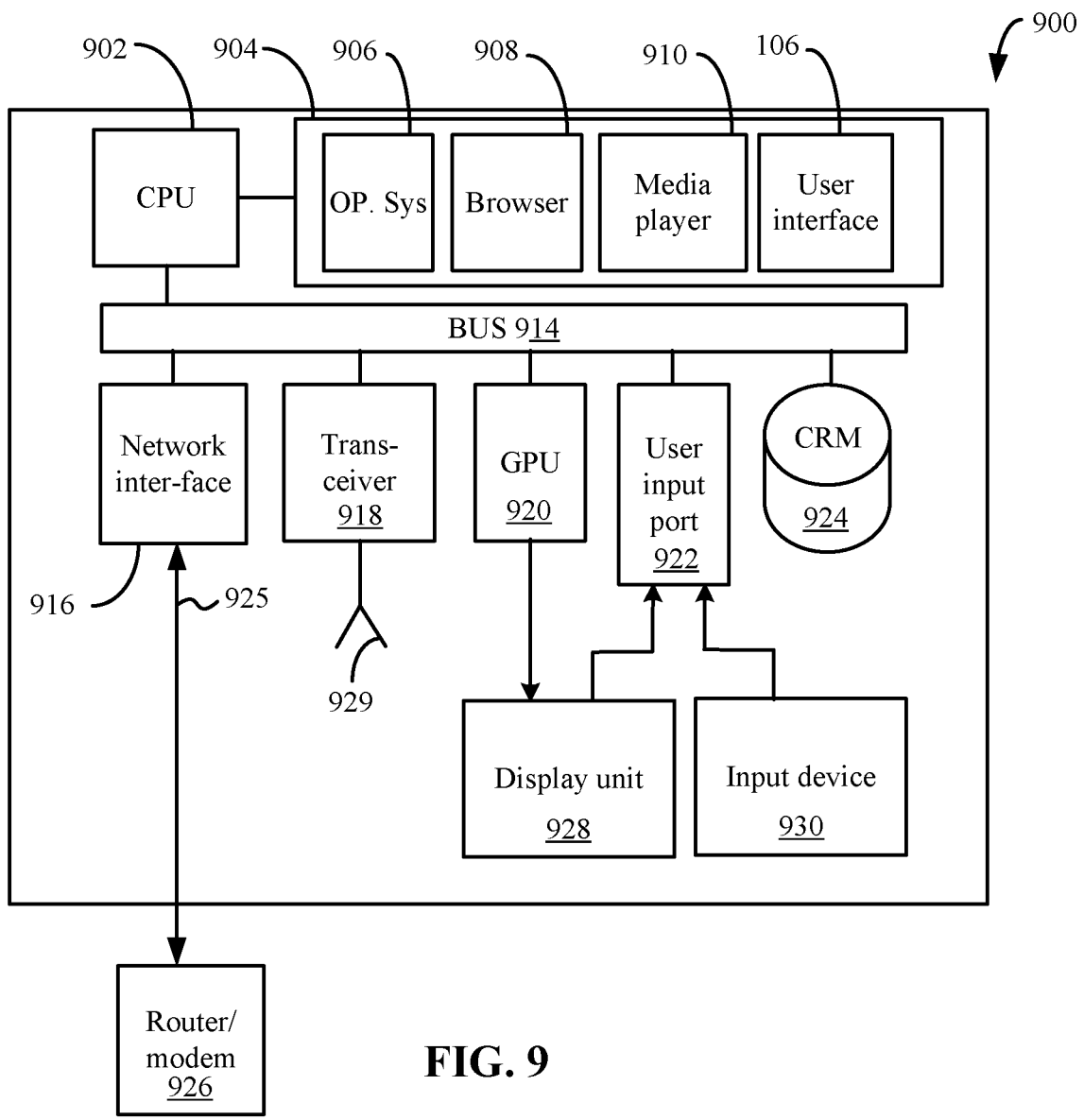
FIG. 9 depicts a diagrammatic view of an apparatus for viewing video content and advertisements.

Referring to FIG. 9, a diagrammatic view of an apparatus 900 for viewing video content and advertisements is illustrated. In selected embodiments, the apparatus 900 may include a processor (CPU) 902 operatively coupled to a processor memory 904, which holds binary-coded functional modules for execution by the processor 902. Such functional modules may include an operating system 906 for handling system functions such as input/output and memory access, a browser 908 to display web pages, and media player 910 for playing video. The modules may further include user interface 106. The memory 904 may hold additional modules not shown in FIG. 9, for example modules for performing other operations described elsewhere herein.

A bus 914 or other communication component may support communication of information within the apparatus 900. The processor 902 may be a specialized or dedicated microprocessor configured or operable to perform particular tasks in accordance with the features and aspects disclosed herein by executing machine-readable software code defining the particular tasks. Processor memory 904 (e.g., random access memory (RAM) or other dynamic storage device) may be connected to the bus 914 or directly to the processor 902, and store information and instructions to be executed by a processor 902. The memory 904 may also store temporary variables or other intermediate information during execution of such instructions.

A computer-readable medium in a storage device 924 may be connected to the bus 914 and store static information and instructions for the processor 902; for example, the storage device (CRM) 924 may store the modules 906, 908, 910 and 912 when the apparatus 900 is powered off, from which the modules may be loaded into the processor memory 904 when the apparatus 900 is powered up. The storage device 924 may include a non-transitory computer-readable storage medium holding information, instructions, or some combination thereof, for example instructions that when executed by the processor 902, cause the apparatus 900 to be configured or operable to perform one or more operations of a method as described herein.

A communication interface 916 may also be connected to the bus 914. The communication interface 916 may provide or support two-way data communication between the apparatus 900 and one or more external devices, e.g., the streaming system 800, optionally via a router/modem 926 and a wired or wireless connection. In the alternative, or in addition, the apparatus 900 may include a transceiver 918 connected to an antenna 929, through which the apparatus 900 may communicate wirelessly with a base station for a wireless communication system or with the router/modem 926. In the alternative, the apparatus 900 may communicate with a video streaming system 800 via a local area network, virtual private network, or other network. In another alternative, the apparatus 900 may be incorporated as a module or component of the system 800 and communicate with other components via the bus 914 or by some other modality.

The apparatus 900 may be connected (e.g., via the bus 914 and graphics processing unit 920) to a display unit 928. A display 928 may include any suitable configuration for displaying information to an operator of the apparatus 900. For example, a display 928 may include or utilize a liquid crystal display (LCD), touchscreen LCD (e.g., capacitive display), light emitting diode (LED) display, projector, or other display device to present information to a user of the apparatus 900 in a visual display.

One or more input devices 930 (e.g., an alphanumeric keyboard, microphone, keypad, remote controller, game controller, camera, or camera array) may be connected to the bus 914 via a user input port 922 to communicate information and commands to the apparatus 900. In selected embodiments, an input device 930 may provide or support control over the positioning of a cursor. Such a cursor control device, also called a pointing device, may be configured as a mouse, a trackball, a track pad, touch screen, cursor direction keys or other device for receiving or tracking physical movement and translating the movement into electrical signals indicating cursor movement. The cursor control device may be incorporated into the display unit 928, for example using a touch sensitive screen. A cursor control device may communicate direction information and command selections to the processor 902 and control cursor movement on the display 928. A cursor control device may have two or more degrees of freedom, for example allowing the device to specify cursor positions in a plane or three-dimensional space.

Some embodiments may be implemented in a non-transitory computer-readable storage medium for use by or in connection with the instruction execution system, apparatus, system, or machine. The computer-readable storage medium contains instructions for controlling a computer system to perform a method described by some embodiments. The computer system may include one or more computing devices. The instructions, when executed by one or more computer processors, may be configured or operable to perform that which is described in some embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of some embodiments may be implemented. The above examples and embodiments should not be deemed to be the only embodiments and are presented to illustrate the flexibility and advantages of some embodiments as defined by the following claims. Based on the above disclosure and the following claims, other arrangements, embodiments, implementations, and equivalents may be employed without departing from the scope hereof as defined by the claims.

What is claimed is:

1. A method comprising:
    reviewing, by a computing device, information from a set of clients, wherein the information is based on interaction with an application associated with a video delivery system;
    selecting, by the computing device, ascription events from the information based on a model that defines ascription events that could lead to an outcome for the video delivery system;
    storing, by the computing device, the ascription events into a set of data structures, wherein the ascription events are stored based on respective timing information associated with the respective ascription event, and wherein one or more of the ascription events that could lead to the outcome are retrievable based on respective timing information for the ascription events;
    receiving, by the computing device, a query that defines a first parameter for the outcome;
    retrieving, by the computing device, entries for the one or more of the ascription events based on the first parameter; and
    ranking, by the computing device, the entries based on a second parameter, wherein the entries are ranked based on respective timing information associated with each of the one or more ascription events.

2. The method of claim 1, wherein the first parameter comprises time information that is used to select the entries for the one or more of the ascription events.

3. The method of claim 1, wherein the first parameter defines metadata associated with the one or more of the ascription events.

4. The method of claim 1, wherein the first parameter defines the outcome.

5. The method of claim 1, wherein the information from the set of clients comprises telemetry information regarding a status of the set of clients.

6. The method of claim 1, wherein:
    the information from the set of clients comprises information associated with the ascription events and information that is not associated with the ascription events, and
    the information not associated with the ascription events is not stored in the set of data structures.

7. The method of claim 1, wherein:
    the ascription events are associated with a set of categories of activities that are performed on the application.

8. The method of claim 1, wherein entries in the set of data structures are not linked with each other.

9. The method of claim 1, wherein the information from the set of clients is from a plurality of clients.

10. The method of claim 1, wherein the model comprises one or more rules to determine the ascription events from the information from the set of clients.

11. The method of claim 10, wherein the one or more rules are automatically determined based on the outcome.

12. A non-transitory computer-readable storage medium containing instructions, that when executed, control a computer system to be operable for:
    reviewing information from a set of clients, wherein the information is based on interaction with an application associated with a video delivery system;
    selecting ascription events from the information based on a model that defines ascription events that could lead to an outcome for the video delivery system;
    storing the ascription events into a set of data structures, wherein the ascription events are stored based on respective timing information associated with the respective ascription event, and wherein one or more of the ascription events that could lead to the outcome are retrievable based on respective timing information for the ascription events;

receiving a query that defines a first parameter for the outcome;

retrieving entries for the one or more of the ascription events based on the first parameter; and ranking the entries based on a second parameter, wherein the entries are ranked based on respective timing information associated with each of the one or more ascription events.

13. The non-transitory computer-readable storage medium of claim 12, wherein:

the information from the set of clients comprises information associated with the ascription events and information that is not associated with the ascription events, and the information not associated with the ascription events is not stored in the set of data structures.

14. The non-transitory computer-readable storage medium of claim 12, wherein entries in the set of data structures are not linked with each other.

15. The non-transitory computer-readable storage medium of claim 12, wherein the model comprises one or more rules to determine the ascription events from the information from the set of clients.

16. The non-transitory computer-readable storage medium of claim 12, wherein the first parameter comprises time information that is used to select the entries for the one or more of the ascription events.

17. The non-transitory computer-readable storage medium of claim 12, wherein the first parameter defines metadata associated with the one or more of the ascription events.

18. The non-transitory computer-readable storage medium of claim 12, wherein the first parameter defines the outcome.

19. The non-transitory computer-readable storage medium of claim 12, wherein:

the ascription events are associated with a set of categories of activities that are performed on the application.

20. An apparatus comprising:

one or more computer processors; and a non-transitory computer-readable storage medium comprising instructions, that when executed, control the one or more computer processors to be operable for:

reviewing information from a set of clients, wherein the information is based on interaction with an application associated with a video delivery system;

selecting ascription events from the information based on a model that defines ascription events that could lead to an outcome for the video delivery system;

storing the ascription events into a set of data structures, wherein the ascription events are stored based on respective timing information associated with the respective ascription event, and wherein one or more of the ascription events that could lead to the outcome are retrievable based on respective timing information for the ascription events;

receiving a query that defines a first parameter for the outcome;

retrieving entries for the one or more of the ascription events based on the first parameter; and ranking the entries based on a second parameter, wherein the entries are ranked based on respective timing information associated with each of the one or more ascription events.

* * * * *